United States Patent [19]
Huang

[11] Patent Number: 5,645,501
[45] Date of Patent: Jul. 8, 1997

[54] GRIP CONSTRUCTION

[76] Inventor: Ben Huang, 19472 Woodlands La., Huntington Beach, Calif. 92648

[21] Appl. No.: 542,009

[22] Filed: Nov. 13, 1995

Related U.S. Application Data

[63] Continuation-in-part of Ser. No. 637,931, Jan. 14, 1991, abandoned, Ser. No. 890,383, May 26, 1992, abandoned, Ser. No. 953,190, Sep. 29, 1992, and Ser. No. 58,313, May 3, 1993.

[51] Int. Cl.$^6$ ........................................ A63B 49/08
[52] U.S. Cl. ................................... 473/549; 473/302
[58] Field of Search ............ 273/73 J, 75; 473/300–303

[56] References Cited

U.S. PATENT DOCUMENTS

| | | |
|---|---|---|
| 1,139,843 | 5/1915 | Brown . |
| 1,556,781 | 10/1925 | Gjorup . |
| 1,701,856 | 2/1929 | Kraeuter . |
| 1,940,104 | 12/1933 | Russell et al. ..................... 273/81 |
| 1,943,399 | 1/1934 | Smith ............................... 273/81 |
| 2,003,917 | 6/1935 | Bowden ............................ 273/75 |
| 2,046,164 | 6/1936 | Herkner ........................... 273/81 |
| 2,086,062 | 7/1937 | Bray ................................ 273/81 |
| 2,166,044 | 7/1939 | Fletcher ........................... 273/75 |
| 2,166,045 | 7/1939 | Fletcher ........................... 273/75 |
| 2,513,655 | 7/1950 | Lamkin et al. .................... 273/81 |
| 3,582,456 | 6/1971 | Stolki .............................. 161/165 |
| 3,654,066 | 4/1972 | Fukushima et al. ............... 161/160 |
| 3,845,954 | 11/1974 | Case ................................ 273/75 |
| 3,848,480 | 11/1974 | Oseroff ........................... 74/558.5 |
| 3,848,871 | 11/1974 | Sweet .............................. 273/75 |
| 3,860,469 | 1/1975 | Gregorian et al. ................. 156/83 |
| 3,881,521 | 5/1975 | Johansen et al. ................. 138/126 |
| 3,899,172 | 8/1975 | Vaughn et al. .................... 273/73 |
| 4,015,851 | 4/1977 | Pennell ............................ 273/75 |
| 4,044,625 | 8/1977 | D'Haem .......................... 74/558.5 |
| 4,070,020 | 1/1978 | Dano ............................... 273/73 |
| 4,100,006 | 7/1978 | Buckley ............................ 156/78 |
| 4,174,109 | 11/1979 | Gaiser ............................ 273/81.6 |
| 4,284,275 | 8/1981 | Fletcher ........................... 273/75 |
| 4,347,280 | 8/1982 | Lau et al. ........................ 426/304.4 |
| 4,454,187 | 6/1984 | Flowers et al. .................... 426/159 |
| 4,660,832 | 4/1987 | Shomo .............................. 273/73 |
| 4,662,415 | 5/1987 | Prout ............................... 150/52 |
| 4,736,949 | 4/1988 | Muroi .............................. 273/73 |
| 4,765,856 | 8/1988 | Doubt ............................. 156/212 |
| 4,853,054 | 8/1989 | Turner et al. ...................... 156/78 |
| 4,934,024 | 6/1990 | Sexton ............................. 16/111 |
| 5,042,804 | 8/1991 | Uke ................................. 273/75 |
| 5,110,653 | 5/1992 | Landi .............................. 428/116 |
| 5,275,407 | 1/1994 | Soong ............................... 273/73 |
| 5,567,091 | 10/1996 | Spector ............................ 428/222 |
| 5,647,326 | 3/1987 | Pott ................................. 156/77 |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 443228 | 2/1936 | United Kingdom . |
| 870021 | 6/1961 | United Kingdom . |
| 979242 | 1/1965 | United Kingdom . |

*Primary Examiner*—William E. Stoll
*Attorney, Agent, or Firm*—Fulwider Patton Lee & Utecht, LLP

[57] ABSTRACT

A shock absorbing grip for the handle of a tennis racquet or the like having a polyurethane layer bonded to a felt layer where the ratio of the thickness of the polyurethane layer to the felt layer is equal to or larger than about 0.18 and preferably the thickness ratio is about equal. The bonded-together layers are configured as a strip which is wrapped about the racquet handle with the side edges of the being tightly butted together.

10 Claims, 4 Drawing Sheets

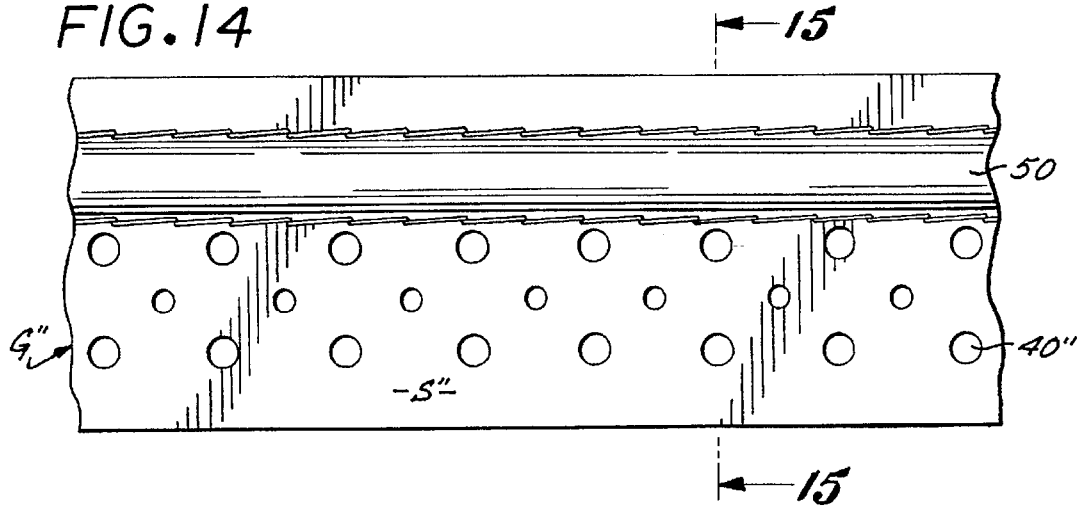
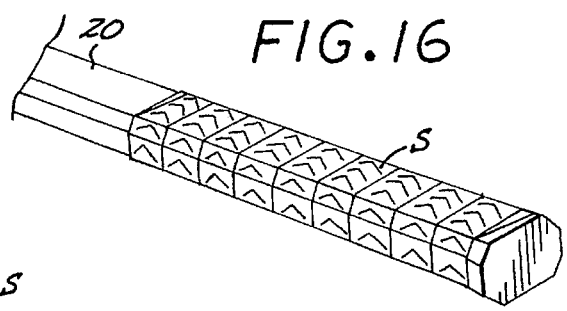
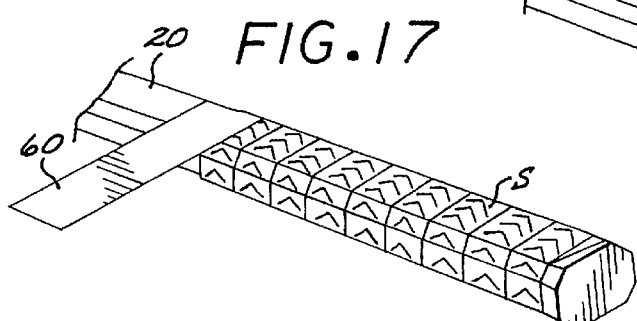
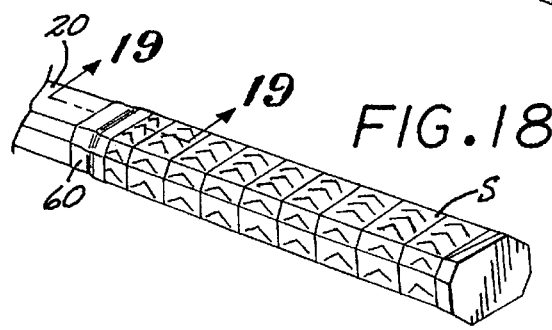
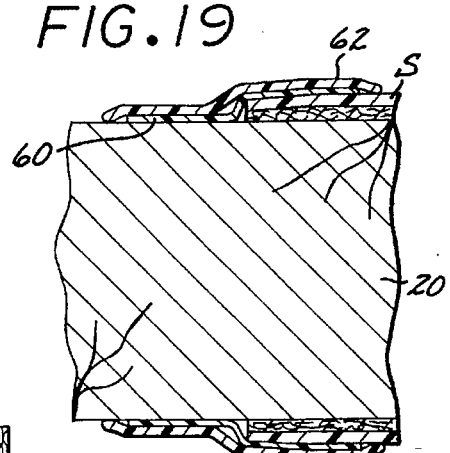
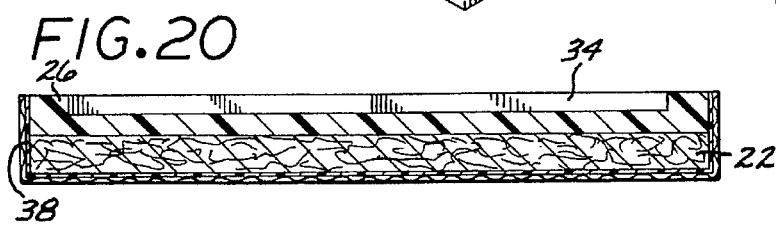

GRIP CONSTRUCTION

This is a continuation-in-part of application(s) Ser. No. 07/637,931 filed on Jan. 14, 1991 (now abandoned) Ser. No. 07/890,383 filed on May 26, 1992 (now abandoned) Ser. No. 07/953,190 filed on Sep. 29, 1992 (pending) Ser. No. 08/058,313 filed on May 3, 1993 (pending)

BACKGROUND OF THE INVENTION

The present invention relates to an improved grip for racquets and other devices employing handles that are subject to shock when such devices are impacted, as for example, tennis ball racquets, racquetball racquets, golf clubs, baseball bats and hammers.

It is well known that shock generated by impact between a device such as a tennis racquet and a tennis ball can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by striking a tennis ball with a tennis racquet. The energy generated is usually of high frequency and short duration with rapid decay, and which is often known as "impact shock." Tight grasping of a grip to keep it from slipping contributes to "tennis elbow." Various types of grips have been proposed for inhibiting "tennis elbow," however, such grips have not solved such problem. The grip of the present invention successfully reduces or even eliminates "tennis elbow" type shock to the muscle tissue and arm joints of the users of tennis racquets, racquetball racquets, golf clubs, baseball bats, and other impact imparting devices such as hammers.

Conventional prior art grips of this type have conventionally utilized a layer of polyurethane backed with a layer of felt. In general, the felt layer has a thickness of about 1.40 mm. The polyurethane layer is generally thinner than 0.25 mm, and has been considered only as providing tackiness, i.e., resistance to the slip caused by a sweaty hand. The polyurethane has not been considered to be useful for inhibiting shock. The felt was relied upon to cushion the user's arm and hand against the shock created when the ball hits the racquet.

Applicant has previously developed resilient grips which successfully reduce or even eliminate "tennis elbow" type shock to the muscle and arm joints of the users of tennis racquets, racquet ball racquets, golf clubs, baseball bats and other impact imparting devices such as hammers. See, for example, U.S. Pat. No. 5,374,059 granted to applicant Dec. 20, 1994. Such earlier grips utilize a polyurethane layer bonded to a felt layer to define a strip which is spirally wrapped around the handle of a racquet or the like to conform to the external configuration of such handle. In such earlier grips of applicant's design the thickness of the polyurethane layer relative to the thickness of the felt layer as compared to prior art resilient grips, i.e. the ratio of the thickness of the polyurethane layer to the thickness of the felt layer was a minimum of approximately 0.18, with the thickness of the polyurethane layer having been about equal to or thicker than the thickness of the textile layer in a typical grip of my design. In such grips the handle-abutting side of the strip utilized skiving, with the felt layer tapering from a transverse central region upwardly and outwardly towards the transverse side edges of the strip. The side edges of the strip were overlapped as the strip was wrapped around the handle so that the strip did not have a smooth configuration along its length. Additionally, the skiving tended to weaken the grip. Moreover, the side edges of the strip tended to unravel in use. It was also determined that where the strip was not properly applied to the handle, the grip would tend to loosen relative to the handle.

SUMMARY OF THE INVENTION

Applicant has discovered that polyurethane and felt grips of the aforedescribed nature can be made without skiving to thereby afford a stronger, longer lasting grip. By eliminating skiving, the grip of the present invention provides a longer lasting stronger grip which resists unraveling in use. Additionally, since the side edges of the strip are butted together as the strip is wrapped about the handle, the grip provides a smooth configuration over the entire grip surface. The improved grip of the present invention also incorporates an adhesive material that completely covers the inner surface of the felt layer to facilitate wrapping the strip about the handle and afford increased securement of the grip to the handle as the grip is used, with the tighter the grasp of the player the tighter the securement of the grip to the handle. The grip of the present invention additionally reduces the manufacturing time and therefore the cost of the grip to the user as compared to prior grips. Moreover, it is easier to properly wrap the strip onto the handle so as to obtain a firm attachment of the grip to the handle.

These and other features and advantages of the present invention will become apparent from the following detailed description, when taken in conjunction with the accompanying drawings.

BRIEF DESCRIPTION OF THE DRAWINGS

FIG. 14 is a top plan view of a third form of resilient grip embodying the present invention utilizing a raised protrusion to enhance the gripping power of the grip.

FIG. 15 is a transverse vertical sectional view taken in enlarged scale along 15—15 of FIG. 14.

FIG. 16 is a perspective view showing a grip embodying the present invention wrapped about a tennis racquet handle.

FIG. 17 is a view similar to FIG. 16 showing a finishing tape being interposed between the grip and the tennis racquet handle.

FIG. 18 is a view similar to FIGS. 16 and 17 showing the grip and finishing tape as they appear when applied to a tennis racquet handle;

FIG. 19 is a longitudinal vertical sectional view taken in enlarged scale along line 19—19 of FIG. 18 showing an optional rubber sleeve arranged over the finishing tape; and FIG. 20 is a transverse vertical sectional view similar to FIG. 4 but showing the adhesive extending upwardly along the side edges of the strip.

DETAILED DESCRIPTION OF PREFERRED EMBODIMENTS

Figure 1:
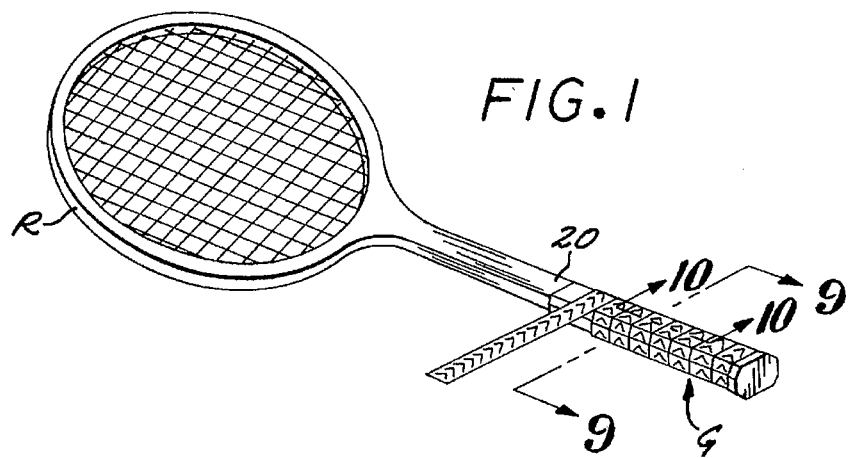
FIG. 1 is a perspective view showing a resilient grip embodying the present invention being wrapped about the handle of a tennis racquet.

Referring to the drawings, my improved shock absorbing grip G of the present invention is shown in FIG. 1 being applied to the handle 20 of a tennis racquet R. The grip G includes an open-pored felt layer generally designated 22, having an inner or bottom surface 24 which is adhered to the racquet handle 20. The grip G also includes a smooth closed pore polyurethane layer generally designated 26, which is bonded to the felt layer 22. The bonded-together polyurethane and textile layers are seen to be configured as a unitary strip S which is wrapped about the racquet handle 20 in the manner depicted in FIG. 1.

Figure 11:
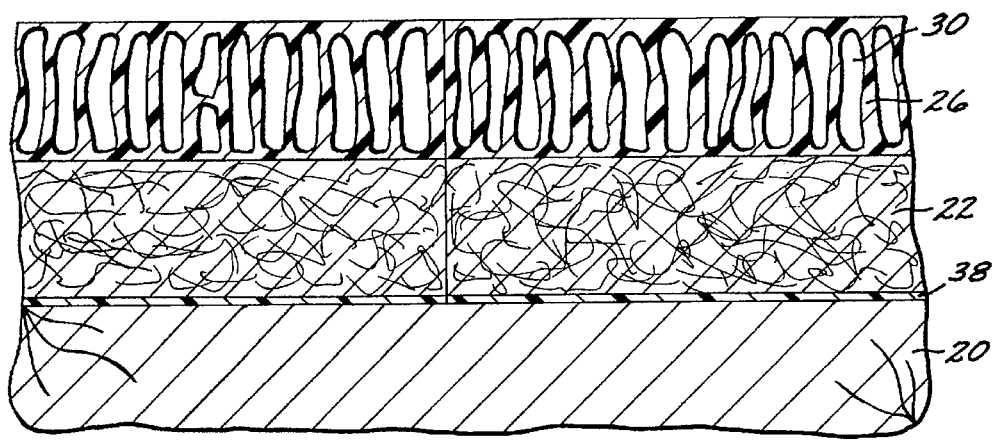
FIG. 11 is a detailed sectional view taken in enlarged scale of the area designated 11 in FIG. 10.

More particularly, the felt layer 22 is formed of a suitable open-pored material and has its upper or outer surface bonded to the lower surface 28 of the polyurethane layer 26. As indicated in FIG. 11, the polyurethane layer 26 is formed with pores 30 which extend vertically, i.e. generally normal to the longitudinal axis the strip S and racquet handle 20 when the grip has been affixed to such handle. The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 30 will extend perpendicularly relative to the longitudinal axis of the strip, while the underside 28 of the polyurethane layer 26 is bonded to the upper surface of the felt strip. As noted hereinbefore applicant has discovered that greatly improved shock absorbing qualities may be obtained in a racquet or golf club grip where the thickness of the polyurethane layer to the thickness of the felt layer is increased over the thickness over the ratio employed in prior art grips. More specifically, applicant considers that the ratio of the thickness of the polyurethane layer to the textile layer should be a minimum of approximately 0.18. In the embodiment shown in the drawings, the thickness of the polyurethane layer is about equal to the thickness of the felt layer. Excellent results have been obtained with this ratio.

Figure 2:
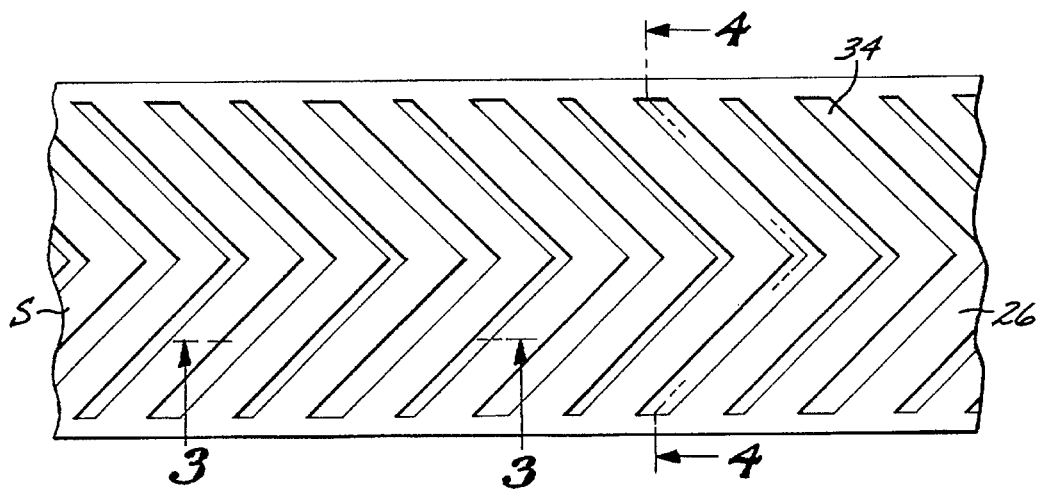
FIG. 2 is a broken top view of a grip embodying the present invention.
Figure 3:
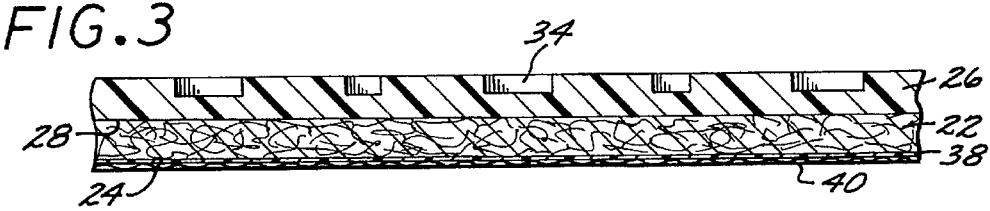
FIG. 3 is longitudinal vertical sectional view taken in enlarged scale along line 3—3 of FIG. 2.
Figure 4:
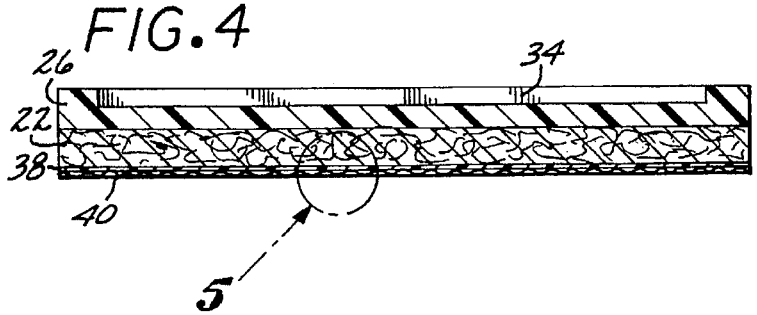
FIG. 4 is a transverse vertical sectional view taken in enlarged scale along line 4—4 of FIG. 2.
Figure 5:
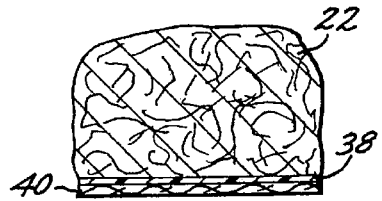
FIG. 5 is an enlarged vertical sectional view showing the details of the encircled area designated 5 in FIG. 4.

As indicated particularly in FIGS. 2, 3 and 4, the outer surface of the polyurethane layer 26 may be formed over its upper portion with a plurality of chevron-shaped treads 34 arranged in a herringbone pattern to reduce slippage of a player's hand on the grip G relative to the handle 20. Other types of friction increasing indentations may be readily formed in the polyurethane layer 26 if desired. Preferably, the angles between the longitudinal center line of grip G and the facing edges of treads 34 will approximate 45°–50°. The polyurethane layer 26 provides a cushioned grasp of the player's hand on the handle 20 and also enhances the player's grip by providing increased tackiness between the players hand and the grip. The felt layer 22 provides strength to the polyurethane layer 26 and serves as a means for attaching the bonded-together polyurethane and felt strip to handle 20.

As shown in FIGS. 3 and 4, the underside or bottom 24 of the felt layer 22 is provided with a conventional adhesive material 38 which completely covers the underside of the felt layer. The underside of the adhesive material 38 is originally covered with a protective quick-release tape 40. Alternatively, as shown in FIG. 20, the adhesive material 38 may be extended upwardly over the sides of the strip S, and the protective quick-release tape 40 likewise so extended.

Figure 6:
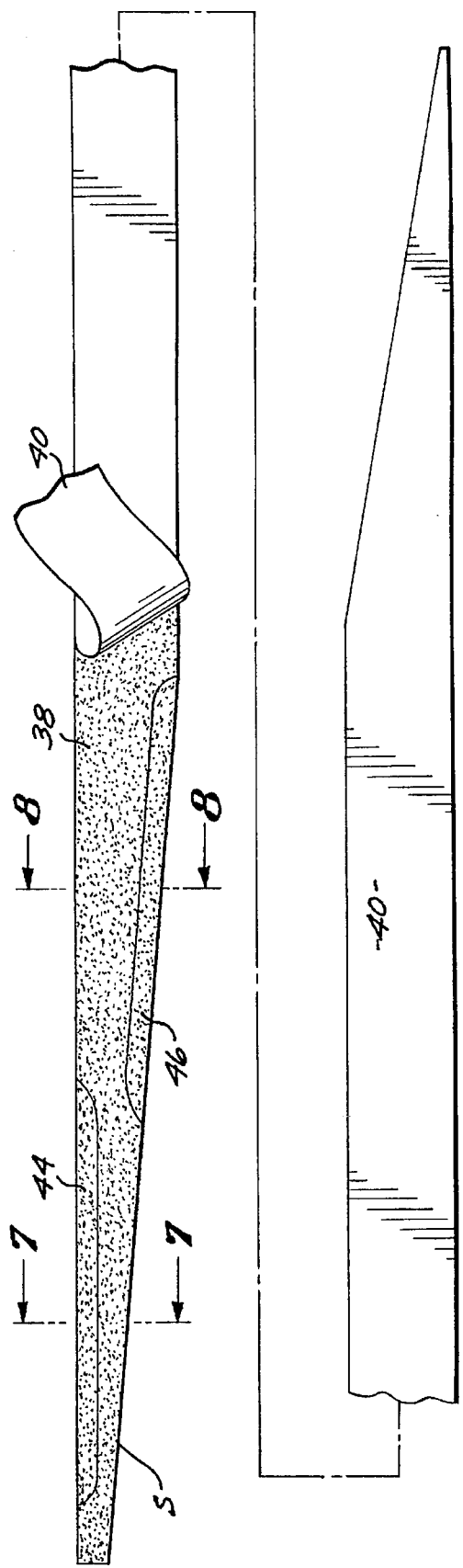
FIG. 6 is a bottom view of the grip shown in the preceding figures.
Figure 9:
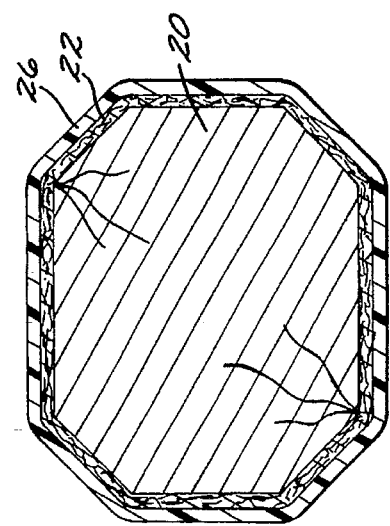
FIG. 9 is a vertical sectional view taken in enlarged scale along line 9—9 of FIG. 1.
Figure 7:
FIG. 7 is a transverse vertical sectional view taken in enlarged scale along line 7—7 of FIG. 6.
Figure 8:
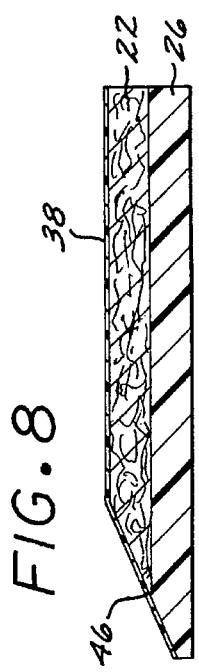
FIG. 8 is a transverse vertical sectional view taken in enlarged scale along line 8—8 of FIG. 6.
Figure 10:
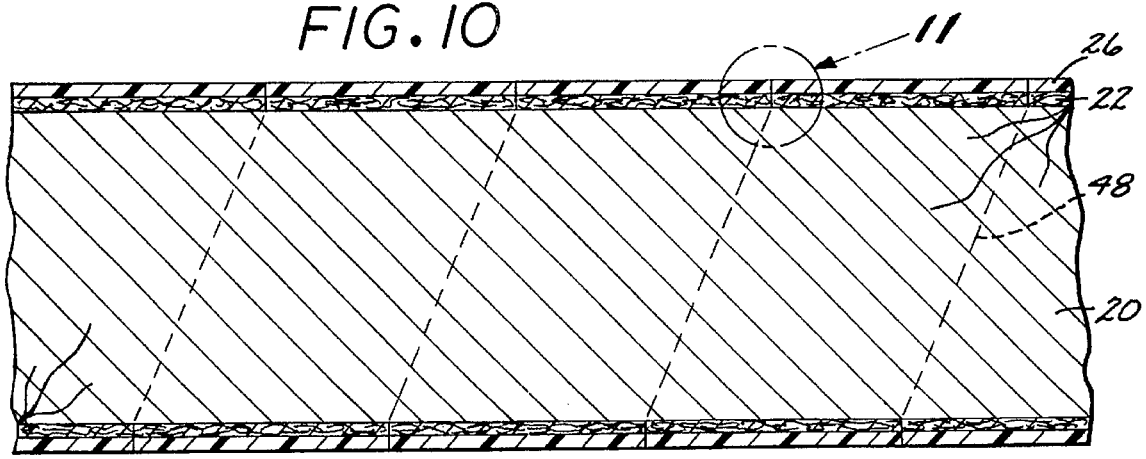
FIG. 10 is a vertical sectional view taken in enlarged scale along line 10—10 of FIG. 1.

To apply the strip G to the racquet handle 20 the quick-release tape 40 is peeled off the underside of the felt layer 22, as indicated in FIG. 6. The strip S is then spirally wound around the racquet handle 20 starting with the butt end of the handle. It should be particularly noted that the starting end 42 (relative to the racquet's butt end) of the strip S is provided with outwardly and downwardly slanted leading and trailing areas 44 and 46, respectively, on opposite edges of the strip, the rear portion of the leading area 44 slightly overlapping the front portion of the trailing area 46. The provision of leading and trailing areas 44 and 46 permits the strip to be initially wrapped about 1½ times around the butt end of the handle, with a smooth configuration of the strip resulting from the utilization of such slanted overlapped areas 44 and 46. As indicated in FIGS. 10 and 11, the edges of the strip S do not overlap, as with prior resilient grips, and, instead, butt tightly against one another as shown at 48 so as to provide a smooth overall grip surface which enhances the player's control over the handle. Also, it is important to note that the felt layers of two abutting side edges of the strip affords a very firm contact between these side edges. Such firm contact would not be possible if the strip was formed solely of polyurethane, since polyurethane is quite soft as compared to felt. Tight abutment of the strip's side edges ensure that applicant's strip does not unravel even when the grip is exposed to hard wear during play. As a result applicant's grip is more durable and hence affords a longer service life than prior art grips.

Figure 12:
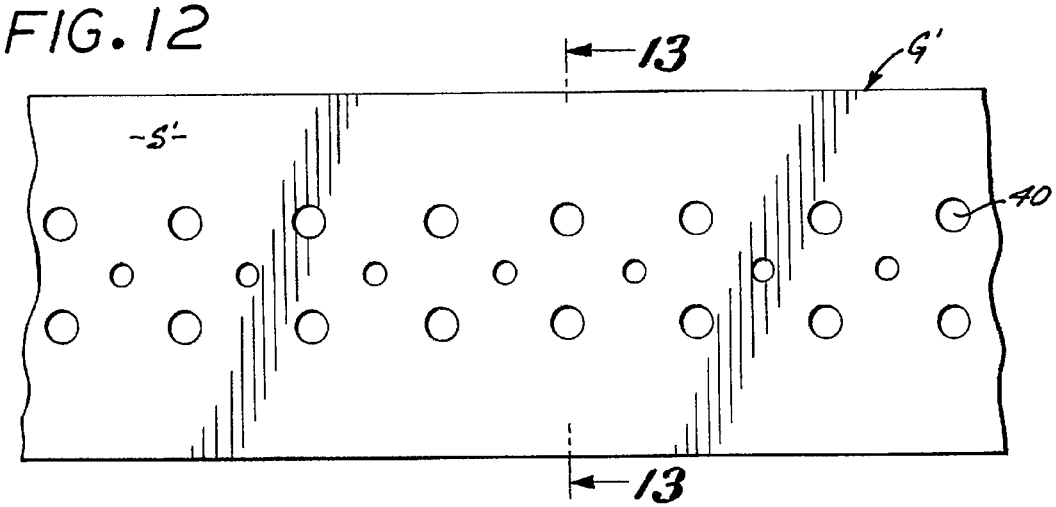
FIG. 12 is a top plan view of second form of resilient grip embodying the present invention.
Figure 13:
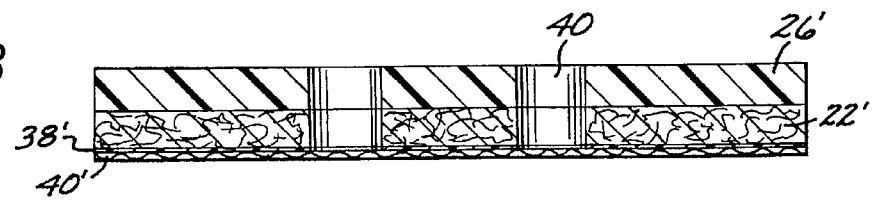
FIG. 13 is a transverse vertical sectional view taken in enlarged scale along line 13—13 of FIG. 12.

Referring now to FIGS. 12 and 13 there is shown a second form of resilient grip G' embodying the present invention. The construction of grip G' is similar to that described hereinbefore, with the exception that the polyurethane and felt layers are formed with vertically extending perforations 40 rather than the treads 34. Such perforations 40 enhance the absorption rate of perspiration from a players hand, permitting the grip G' to maintain a dry feeling to the player's hand. It should be understood that a grip embodying the present invention could be provided both with the aforedescribed treads and perforations, with the perforations preferably intersecting one or more of the treads to enhance the rate of perspiration from the exterior surface of the grip into the felt layer. Additionally, the grip could be provided with both perforations and dimples (not shown) similar to the dimples disclosed in my U.S. Pat. No. 5,374,059.

Referring now to FIGS. 14 and 15 there is shown a third form of grip G" embodying the present invention. The grip" is similar in construction to grips G and G' with the exception that strip S" utilizes a longitudinally extending protrusion 50 formed along the length of the polyurethane layer 26". The protrusion 50 is defined by means of a stitching 54 extending from the underside of the felt layer 22" over the outer surface of the polyurethane layer 26" to tighten the portion of the polyurethane layer abutting between such stitching and thereby define protrusion 50. It should be understood that when the strip S" is wrapped about the bracket handle 20, the protrusion 50 will define a spiral profile which permits the racquet user to maintain firm hand contact with the grip G" even when the user's hand is moist from perspiration.

It should be particularly noted that with each of the aforedescribed grips of the present invention the exterior surface of the polyurethane layer provides tackiness that assures a firm contact of the racquet users hand with the grip at all times, even when the ball is not struck in the center portion of the racquet. This advantage can be enhanced by the provision of the chevrons, pores and protrusion described hereinbefore. The use of the perforations not only increases absorption and allows for faster drying of the grip, but also further enhances a cushioning effect of the grip by providing a controlled restriction of air escaping from within the pores of the textile layer when the grip is grasped by the racquet user.

Referring now to FIGS. 16 through 19, the method of wrapping the grips around racquet handle 20 is shown. In FIG. 16 the strip S is shown after it has been spirally wrapped about the racquet handle 20, with the side edges thereof in tight abutment. In FIG. 17, a length of conventional finishing tape 60 is shown being wrapped about the end of the strip proximate the racquet head. In FIG. 18, the finishing tape 60 is shown in place so as to prevent unraveling of the strip relative to the racquet handle. Finally, in FIG. 19 there is shown an optional rubber sleeve 62 which covers the finishing tape 60 so as to both enhance the appearance of the completed grip and inhibit unraveling of the finishing tape from the racquet handle. It should be noted that where the sides of the strip S are provided with a coating of adhesive material 38 as shown in FIG. 20, a very firm attachment of the strip to the racquet handle is afforded. Also, such arrangement reduces any tendency of the edges of the strip to unravel.

It will be apparent to those skilled in the art that various modifications can be made without departing from the spirit and scope of the invention. Accordingly, it is not intended that the invention be limited except by the appended claims.

What is claimed is:

1. The combination of a handle for an impact imparting device and a shock absorbing resilient grip applied over such handle to conform to the external configuration of the handle, the handle having a butt end, said combination comprising:

a strip which is spirally wrapped about said handle, the strip having a starting end which engages the butt end of the handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip, the thickness ratio of the polyurethane layer to the thickness of the textile layer being equal to or larger than approximately 0.18, and with the textile layer providing strength for the polyurethane layer while the polyurethane layer both absorbs shocks and provides tackiness so as to inhibit slippage of a user's hand relative to said handle;

an adhesive material applied over the inner surface of the felt layer;

the strip being spirally wrapped about the handle with the side edges of the strip being in tight abutment and with the side edges of the felt layer being in firm contact with one another whereby the exterior surface of the strip is of smooth non-overlapping configuration and unraveling of the strip is inhibited; and the starting end of the strip being formed with outwardly and downwardly slanted leading and trailing areas on opposite sides of such starting edge, the rear portion of the leading area overlapping the trailing area to provide a smooth configuration of the strip on the butt end of the handle.

2. The combination of claim 1, wherein the polyurethane layer is about equal in thickness to the felt layer.

3. A combination of claim 2, wherein said strip is formed with a longitudinally extending protrusion which defines a spiral profile when the strip is wrapped about said handle.

4. The combination of claim 2, where the polyurethane layer is formed over its upper portion with a plurality of treads to reduce slippage of a player's hand relative to the grip.

5. The combination of claim 2, wherein the strip is formed with perforations to enhance the absorption rate of perspiration from a player's hands.

6. The combination of claim 1, where the polyurethane layer is formed over its upper portion with a plurality of treads to reduce slippage of a player's hand relative to the grip.

7. A combination of claim 1, wherein said strip is formed with a longitudinally extending protrusion which defines a spiral profile when the strip is wrapped about said handle.

8. The combination of claim 1, wherein the strip is formed with perforations to enhance the absorption rate of perspiration from a player's hands.

9. The combination of claim 1, wherein the sides of the strip are provided with a coating of adhesive to further reduce any tendency of the strip to unravel from the handle.

10. The combination of claim 9, wherein the strip is formed with perforations to enhance the absorption rate of perspiration from a player's hands.

* * * * *